(12) United States Patent
Kissell

(10) Patent No.: US 6,523,104 B2
(45) Date of Patent: Feb. 18, 2003

(54) MECHANISM FOR PROGRAMMABLE MODIFICATION OF MEMORY MAPPING GRANULARITY

(75) Inventor: Kevin D. Kissell, Le Bar sur Loup (FR)

(73) Assignee: MIPS Technologies, Inc., Mountain View, CA (US)

( * ) Notice: Subject to any disclaimer, the term of this patent is extended or adjusted under 35 U.S.C. 154(b) by 17 days.

(21) Appl. No.: 09/905,180

(22) Filed: Jul. 13, 2001

(65) Prior Publication Data

US 2003/0014609 A1 Jan. 16, 2003

(51) Int. Cl.[7] .............................................. G06F 12/00
(52) U.S. Cl. ...................... 711/206; 711/202; 711/203; 711/207; 711/170; 711/173
(58) Field of Search ................. 711/202–203, 206–207, 711/170, 173

(56) References Cited

U.S. PATENT DOCUMENTS 5,963,984 A  * 10/1999 Garibay, Jr. et al. ........ 711/206
6,336,180 B1 *  1/2002 Long et al. ................... 712/34

* cited by examiner

Primary Examiner—Don Hyun Yoo
Assistant Examiner—Mehdi Namazi
(74) Attorney, Agent, or Firm—Richard K. Huffman; James W. Huffman

(57) ABSTRACT

An apparatus and method are provided that enable system designers to have programmable minimum memory page sizes. The apparatus has a memory management unit (MMU) for storing a plurality of page table entries (PTEs) and a pagegrain register for prescribing a minimum page size. Each of the PTEs in the MMU specifies a page granularity for a corresponding physical memory page, where the page granularity is bounded by the minimum page size. The MMU has and page granularity logic. The page granularity logic determines a page size for the corresponding physical memory page. The page size is determined based on the minimum page size and the page granularity. The pagegrain register prescribes the minimum page size, in default, according to a legacy memory management protocol, and in alternative, as one of the programmable minimum memory page sizes according to an extended memory management protocol.

37 Claims, 7 Drawing Sheets

Programmable Page Granularity Mechanism

FIG. 4
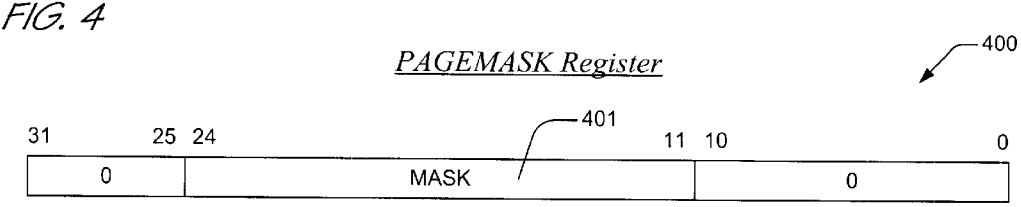
FIG. 5
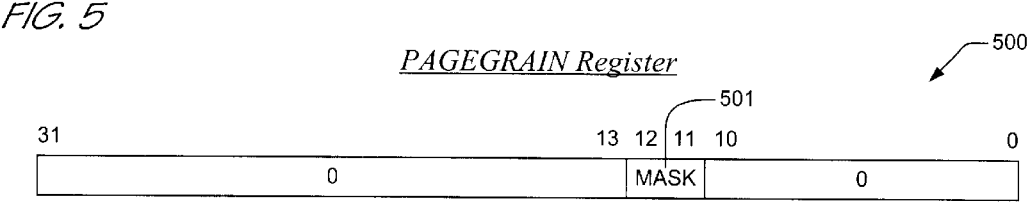
FIG. 6
Page Size Encoding
| PAGE SIZE | PAGEMASK REGISTER BIT | | | | | | | | | | | | | |
|---|---|---|---|---|---|---|---|---|---|---|---|---|---|---|
| | 24 | 23 | 22 | 21 | 20 | 19 | 18 | 17 | 16 | 15 | 14 | 13 | 12[1] | 11[1] |
| 1 KB | 0 | 0 | 0 | 0 | 0 | 0 | 0 | 0 | 0 | 0 | 0 | 0 | 0 | 0 |
| 2 KB | 0 | 0 | 0 | 0 | 0 | 0 | 0 | 0 | 0 | 0 | 0 | 0 | 0 | 1 |
| 4 KB | 0 | 0 | 0 | 0 | 0 | 0 | 0 | 0 | 0 | 0 | 0 | 0 | 1 | 1 |
| 16 KB | 0 | 0 | 0 | 0 | 0 | 0 | 0 | 0 | 0 | 0 | 1 | 1 | 1 | 1 |
| 64 KB | 0 | 0 | 0 | 0 | 0 | 0 | 0 | 0 | 1 | 1 | 1 | 1 | 1 | 1 |
| 256 KB | 0 | 0 | 0 | 0 | 0 | 0 | 1 | 1 | 1 | 1 | 1 | 1 | 1 | 1 |
| 1 MB | 0 | 0 | 0 | 0 | 1 | 1 | 1 | 1 | 1 | 1 | 1 | 1 | 1 | 1 |
| 4 MB | 0 | 0 | 1 | 1 | 1 | 1 | 1 | 1 | 1 | 1 | 1 | 1 | 1 | 1 |
| 16 MB | 1 | 1 | 1 | 1 | 1 | 1 | 1 | 1 | 1 | 1 | 1 | 1 | 1 | 1 |
1. BITS 11 AND 12 CAN BE DISABLED AND OVERRIDDEN BY MASK FIELD OF PAGE GRAIN REGISTER.

Virtual Address EvenOdd Bit Determination

FIG. 10

*Generation of Physical Address* ⟵ 1000

| EVENODD BIT | PAGE SIZE | PAGEGRAIN MASK BITS | PHYSICAL ADDRESS |
|---|---|---|---|
| $VA_{10}$ | 1 KB | 00 | $00 \parallel PFN_{(PABITS-1)-12\ldots 0} \parallel VA_{9\ldots 0}$ |
| $VA_{11}$ | 2 KB | 00 | $00 \parallel PFN_{(PABITS-1)-12\ldots 1} \parallel VA_{10\ldots 0}$ |
| | | 01 | $0 \parallel PFN_{(PABITS-1)-12\ldots 0} \parallel VA_{10\ldots 0}$ |
| $VA_{12}$ | 4 KB | 00 | $00 \parallel PFN_{(PABITS-1)-12\ldots 2} \parallel VA_{11\ldots 0}$ |
| | | 01 | $0 \parallel PFN_{(PABITS-1)-12\ldots 1} \parallel VA_{11\ldots 0}$ |
| | | 11 | $PFN_{(PABITS-1)-12\ldots 0} \parallel VA_{11\ldots 0}$ |
| $VA_{14}$ | 16 KB | 00 | $00 \parallel PFN_{(PABITS-1)-12\ldots 4} \parallel VA_{13\ldots 0}$ |
| | | 01 | $0 \parallel PFN_{(PABITS-1)-12\ldots 3} \parallel VA_{13\ldots 0}$ |
| | | 11 | $PFN_{(PABITS-1)-12\ldots 2} \parallel VA_{13\ldots 0}$ |
| $VA_{16}$ | 64 KB | 00 | $00 \parallel PFN_{(PABITS-1)-12\ldots 6} \parallel VA_{15\ldots 0}$ |
| | | 01 | $0 \parallel PFN_{(PABITS-1)-12\ldots 5} \parallel VA_{15\ldots 0}$ |
| | | 11 | $PFN_{(PABITS-1)-12\ldots 4} \parallel VA_{15\ldots 0}$ |
| $VA_{18}$ | 256 KB | 00 | $00 \parallel PFN_{(PABITS-1)-12\ldots 8} \parallel VA_{17\ldots 0}$ |
| | | 01 | $0 \parallel PFN_{(PABITS-1)-12\ldots 7} \parallel VA_{17\ldots 0}$ |
| | | 11 | $PFN_{(PABITS-1)-12\ldots 6} \parallel VA_{17\ldots 0}$ |
| $VA_{20}$ | 1 MB | 00 | $00 \parallel PFN_{(PABITS-1)-12\ldots 10} \parallel VA_{19\ldots 0}$ |
| | | 01 | $0 \parallel PFN_{(PABITS-1)-12\ldots 9} \parallel VA_{19\ldots 0}$ |
| | | 11 | $PFN_{(PABITS-1)-12\ldots 8} \parallel VA_{19\ldots 0}$ |
| $VA_{22}$ | 4 MB | 00 | $00 \parallel PFN_{(PABITS-1)-12\ldots 12} \parallel VA_{21\ldots 0}$ |
| | | 01 | $0 \parallel PFN_{(PABITS-1)-12\ldots 11} \parallel VA_{21\ldots 0}$ |
| | | 11 | $PFN_{(PABITS-1)-12\ldots 10} \parallel VA_{21\ldots 0}$ |
| $VA_{24}$ | 16 MB | 11 | $PFN_{(PABITS-1)-12\ldots 12} \parallel VA_{23\ldots 0}$ |

MECHANISM FOR PROGRAMMABLE MODIFICATION OF MEMORY MAPPING GRANULARITY

CROSS-REFERENCE TO RELATED APPLICATIONS

This application is related to co-pending U.S. patent application Ser. No. 09/905,185 entitled, Programmable Page Table Access, having a common assignee, common inventors, and filed on the same date as this application.

BACKGROUND OF THE INVENTION

1. Field of the Invention

This invention relates in general to the field of memory management within a computing system, and more particularly to an apparatus and method that extends the capabilities of a software-controlled memory management unit such that the sizes of virtual memory pages can be programmed beyond that provided for under legacy operating system software, while at the same time preserving compatibility of the memory management unit with the legacy operating system software.

2. Description of the Related Art

Virtual memory management techniques were developed during the mid-1970's specifically to address a number of problems experienced in early computing systems related to the execution of programs from memory and the storage of data associated with program execution. Virtual memory management is typically accomplished by providing a memory management unit (MMU) within a computing processing unit (CPU) that serves as an intermediary between address generation logic in the CPU and memory access logic. Under a virtual memory management scheme, application program instructions cause virtual address to be generated by the address logic. The MMU then translates the virtual addresses into physical addresses according to a predefined and configurable memory mapping strategy. The physical addresses are used by the access logic in the CPU to access locations in system memory. Virtual memory management techniques enable the operating system of a computing system to effectively control where application programs are loaded and executed from memory, in addition to providing a means whereby memory can be allocated to a program while it is executing and then released back into the memory pool when the memory is no longer required.

Almost all present day virtual memory techniques divide a CPU's address space into equal-sized blocks called memory pages. Allocating memory to programs in these equal-sized memory pages minimizes fragmentation effects and decreases the number of virtual address bits that must be translated. To access a memory page only requires translation of the upper bits of a virtual address; the lower bits of the virtual address are not translated and merely provide an offset into a memory page. The virtual-to-physical address mapping information, along with other information specifying the attributes (e.g., access protection features) of memory pages, are stored in a designated area of memory known as a page table. And to preclude a page table access each time address translation is required, frequently used page table entries are stored within the MMU in a fast cache known as a translation lookaside buffer (TLB).

Since each generated address in a virtual memory scheme must be translated, TLBs and associated translation logic are critical timing elements in the execution path of a CPU. Accordingly, address translation elements are designed to be extremely fast and efficient, providing only those functions that are essential to the translation of addresses and specification of corresponding physical memory page attributes.

Virtual memory management techniques are extremely powerful, but because of the address translation overhead associated with the generation of every virtual address, employment of these techniques has not migrated into application areas that comprise a few, relatively small, embedded application programs executing on a CPU. Hence, present day MMU/TLB designs provide for memory page sizes that are commensurate with numerous, medium to large application programs executing, say, on a desktop system or workstation. It is quite uncommon today to find page sizes in a virtual memory system that are smaller than 4 KB.

Recent advances in device scaling and fabrication, however, are now enabling manufacturers to provide CPU designs that can absorb the timing and area overhead associated with address translation, thus opening up virtual memory management as an option to the embedded processing world. Yet, while virtual memory management will provide advantages to embedded applications, it is a well known fact that size, cost, and power constraints generally imposed on embedded processing systems result in designs whose memory use must be controlled more stringently than their larger counterparts.

Accordingly there is a need in the art for virtual memory management techniques and methods that provide for page sizes smaller than 4 KB.

In addition, to retain existing customer bases for current virtual memory products, there is a need for these upgraded/improved virtual memory management products to preserve compatibility with legacy memory management software.

SUMMARY OF THE INVENTION

The present invention provides a superior technique for extending the capabilities of existing memory management systems, while at the same time retaining compatibility of these systems with operating system software that implements legacy memory management protocols.

In one embodiment, an apparatus is provided that enables system designers to have programmable minimum memory page sizes. The apparatus has a pagegrain register and a memory mangement unit (MMU). The pagegrain register prescribes a minimum page size, in default, according to a legacy memory management protocol, and in alternative, as one of the programmable minimum memory page sizes according to an extended memory management protocol. The memory management unit (MMU) is coupled to the pagegrain register. The MMU stores a plurality of page table entries (PTEs). Each of the plurality of PTEs specifies a page granularity for a corresponding physical memory page, where the page granularity is bounded by the minimum page size. The MMU has page granularity logic that is configured to determine a page size for the corresponding physical memory page. The page size is determined based on the minimum page size and the page granularity.

One aspect of the present invention features a computer program product for use with a computing device. The computer program product includes a computer usable medium, having computer readable program code embodied in the medium, for causing a CPU to be described, the CPU being capable of sizing memory pages according to a legacy memory management technique or an extended memory management technique. The computer readable program code includes first program code, second program code, and third program code. The first program code describes a memory management unit (MMU). The MMU stores page table entries (PTEs). Each of the PTEs prescribes a page granularity for a corresponding physical memory page, where the page granularity is bounded by a minimum page size. The second program code describes page granularity logic within the MMU. The page granularity logic establishes a page size for the corresponding physical memory page, where the page size is established as a function of a minimum page size and the page granularity. The third program code describes a pagegrain register that is coupled to the MMU. The pagegrain register specifies the minimum page size, in default, according to the legacy memory management technique, and in alternative, according to the extended memory management technique.

Another aspect of the present invention contemplates a computer data signal embodied in a transmission medium. The computer data signal has first computer-readable program code, second computer-readable program code, and third computer-readable program code. The first computer-readable program code describes a memory management unit (MMU). The MMU stores page table entries (PTEs). Each of the PTEs specifies a page granularity for a corresponding physical memory page, where the page granularity is bounded by a minimum page size. The second computer-readable program code describes page granularity logic within the MMU. The page granularity logic determines a page size for the corresponding physical memory page, where the page size is determined based on the minimum page size and the page granularity. The third computer-readable program code describes a pagegrain register coupled to the MMU. The pagegrain register prescribes the minimum page size, in default, according to a legacy memory management protocol, and in alternative, according to an extended memory management protocol.

Yet another aspect of the present invention contemplates a method for providing programmable minimum memory page sizes. The method includes, within a memory management unit (MMU), storing page table entries (PTEs), where each of the PTEs prescribes a page granularity for a corresponding physical memory page, and where the page granularity is bounded by a minimum page size; initiating contents of a pagegrain register to designate the minimum page size such that address translation comports with a legacy memory management protocol; programming the contents of the pagegrain register to designate the minimum page size such that address translation comports with an extended memory management protocol; and determining a page size for the corresponding physical memory page based on the page granularity and the programming.

Yet a further aspect of the present invention features a virtual memory system, for providing programmable minimum memory page sizes. The virtual memory system has a central processing unit (CPU), for accessing instructions/data within a physical memory, where access of the instructions/data is controlled according to a legacy virtual memory management protocol or an extended virtual memory management protocol. The CPU includes a pagegrain register and a memory management unit (MMU). The pagegrain register prescribes a minimum page size, in default, according to the legacy memory management protocol, and in alternative, as one of the programmable minimum memory page sizes according to the extended memory management protocol. The MMU is couples to the pagegrain register. The MMU stores a plurality of page table entries (PTEs). Each of the plurality of PTEs specifies a page granularity for a corresponding physical memory page, where the page granularity is bounded by the minimum page size. The MMU has page granularity logic that determines a page size for the corresponding physical memory page, where the page size is determined based on the minimum page size and the page granularity.

BRIEF DESCRIPTION OF THE DRAWINGS

These and other objects, features, and advantages of the present invention will become better understood with regard to the following description, and accompanying drawings where:

FIG. 4 is a block diagram showing a PAGEMASK register according to the present invention.

FIG. 5 is a block diagram featuring a PAGEGRAIN register according to the present invention.

FIG. 6 is a table illustrating how bits within the PAGEMASK register of FIG. 4 are employed to designate page size in a virtual memory system according to the present invention.

FIG. 10 is a table showing how physical addresses are generated for different bit combinations of the PAGEMASK and PAGEGRAIN registers.

DETAILED DESCRIPTION

Figure 1:
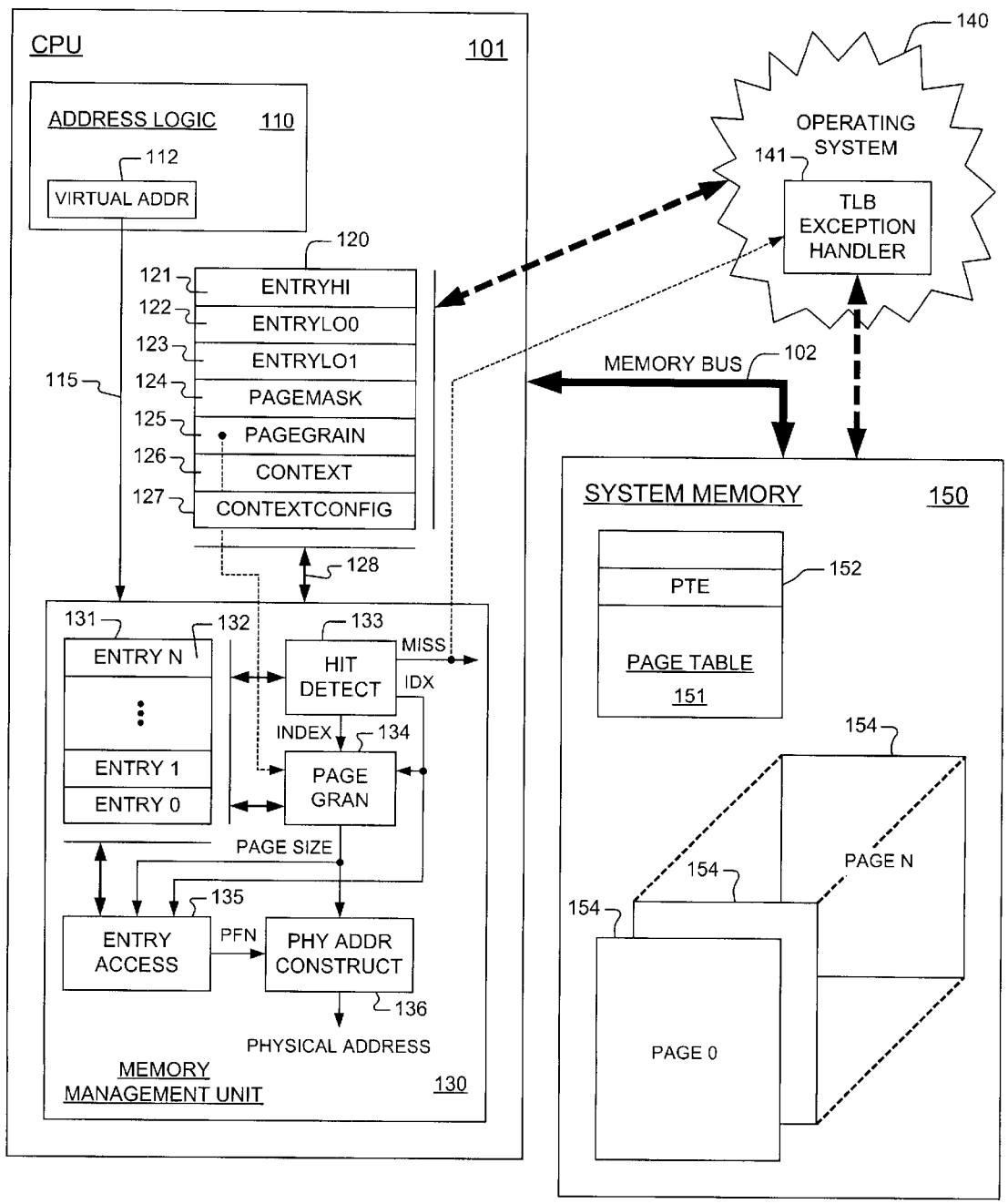
FIG. 1 is a block diagram of a programmable memory page granularity mechanism according to the present invention.

Referring to FIG. 1, a block diagram is presented featuring a programmable memory page granularity mechanism 100 according to the present invention. The programmable memory page granularity mechanism 100 includes a CPU 101 that is coupled to a system memory 150 via a memory bus 102. The CPU 101 and system memory 150 may reside on the same integrated circuit, or they may be embodied as separate integrated circuits. The CPU 101 has address logic 110 that is coupled to a memory management unit (MMU) 130 via bus 115. The CPU 101 also has a register array 120 that couples to the MMU 130 via bus 128. The address logic 110 has a virtual address register 112 that includes a number virtual page number bits (not shown) and offset bits (not shown). The register array 120 has an ENTRYHI register 121, an ENTRYO0 register 122, an ENTRYLO1 register 123, a PAGEMASK register 124, a PAGEGRAIN register 125, a CONTEXT register 126, and a CONTEXTCONFIG register 127. The MMU 130 has a translation lookaside buffer (TLB) 131 comprising a plurality of TLB entries 132. The MMU 130 also has hit detection logic 133 that is coupled to the TLB 131, and page granularity logic 134 that is coupled to both the TLB 131 and the hit detection logic 133. The page granularity logic 134 provides a page size signal, PAGE SIZE, to entry access logic 135 and physical address construction logic 136.

The system memory 150 has a plurality of physical memory pages 154 and a page table 151. The page table 151 has a plurality of page table entries (PTEs) 152.

In a software-based embodiment, the programmable page granularity mechanism 100 according to the present invention is controlled via software within an system operating system 140 that includes a TLB exception handler 141 for handling exceptions associated with the TLB 131 such as entry refill, page access, and page protection exceptions. In an alternative hardware-based embodiment, the programmable page granularity mechanism 100 according to the present invention is controlled via logic within the memory management unit 130.

The programmable page granularity mechanism 100 enables system designers to manage memory 150 using page sizes according to a legacy memory management protocol provided in a legacy operating system 140 or to extend page size granularities according to an extended memory management protocol provided for by an extended operating system 140. The sizes of the memory pages 154, interpretation of the TLB entries 132, and construction of a physical address from the entries 132 and lower bits of the virtual address 112 are determined by contents of the PAGEGRAIN register 125. The PAGEGRAIN register 125 is initiated to a default state that directs the page granularity logic 134 to designate the sizes of the memory pages 154 according to the legacy memory management protocol 140. Instructions within the extended operating system 140, however, enable system programmers to modify bits within the PAGEGRAIN register 125 to provide for programmable minimum page sizes according to the extended memory management protocol 140.

In addition to variable page granularity, the present invention affords capabilities in a software-based embodiment for programming fields within the CONTEXT register 126. The CONTEXT register 126 is employed as a pointer to page table entries 152 in memory 150. The CONTEXTCONFIG register 127 defines the fields within the CONTEXT register 126. Like PAGEGRAIN 125, CONTEXTCONFIG 127 is initialized to comport with legacy memory management protocol, but its contents, and hence, definition of the CONTEXT register 126, may be modified by an extended operating system 140 following initialization.

In a software-based embodiment, TLB instructions are employed by the operating system 140 to manage the TLB 131 by reading and writing the registers 121–127 in the register array 120. The ENTRYO0/ENTRYLO1 registers 122/123 are used to prescribe physical frame numbers for a pair of physical pages 154 that correspond to a upper bits of the virtual address 112 contained in the ENTRYHI register 121. In one embodiment, by setting bits in the PAGEMASK register 124, a programmer can direct the MMU 130 to ignore specified bits of the virtual address 112 and to construct physical addresses using more lower bits of the virtual address 112 and less physical frame number bits, thus increasing the size of the memory pages 154 above a minimum page size for each TLB entry 132. In an alternative embodiment, by setting bits in the PAGEMEASK register 124, a programmer can direct the MMU 130 to interpret additional bits of the virtual address 112 and to construct physical addresses using fewer lower bits of the virtual address (i.e., offset bits) and more physical frame number bits, thus providing for an embodiment where non-default values of the PAGEGRAIN register 125 cause an increase above a maximum page size. When an exception occurs, the CONTEXT register 126 is loaded with a base address for the page table 152 to which is concatenated the virtual page number of the virtual address 112 that caused the exception so that the exception handler 141 can access this register 126 alone to process the exception condition. As programmable page granularity is achieved according to the present invention by modifying the contents of the PAGEGRAIN register 125, configuration of the CONTEXT register 126 via programming the CONTEXTCONFIG register 127 provides for page table entries 152 having a programmable number of bytes (e.g., 4-byte entries 152, 8-byte entries 152) and for field sizes supporting multi-level page table techniques. As noted above, the CONTEXTCONFIG register 127 is initialized to a state that comports with legacy memory management protocols. The CONTEXTCONFIG register 127, in addition to providing for backward compatibility of the CONTEXT register 126 with legacy protocols, also enables optimizations of page table layouts 151 that are useful even in the presence of legacy page granularity. For instance, a CONTEXT register 126 under legacy memory management protocol according to the MIPS32™ architecture generates a direct pointer to page tables 151 having 8-byte page table entries 152, which is roughly twice the number of bytes that are required for most embedded system applications. A typical embedded system operating system requires on the order of 4-byte page table entries 152. Through the CONTEXTCONFIG register 127, a system using legacy page sizes can be programmed to use smaller page table entries 152. Moreover, by allowing for the use of smaller page table entries 152, CONTEXTCONFIG register 127 programming can be employed according to the present invention to speed up the first level of a multi-level page table lookup as well.

When a virtual address 112 is generated for translation by the address logic 110, the boundary between the VPN bits and the offset bits is not visible within the virtual address register 112. Hence, the entire virtual address 112 is provided to the memory management unit 130. Using a upper bits of the virtual address 112, the hit detection logic 133 searches the TLB 131 to find a corresponding entry 132. If the corresponding entry 132 is found, then the index, IDX, of the entry 132 is provided to the page granularity logic 134, the entry access logic 135, and the physical address construction logic 136. If an entry 132 is not found in the TLB 131, then a TLB miss exception is declared via signal MISS. In one embodiment, signal MISS is communicated to the TLB exception handler as an interrupt signal. Upon a TLB miss, the exception handler 141 reads the CONTEXT register 126 to determine the virtual page number that caused the exception and to retrieve the base address of the page table 151, thus providing a pointer to a specific page table entry 152. The page table entry 152 is subsequently provided to the TLB 131 for refill via writing registers 121–124.

When an entry 132 is found that matches the upper bits of the virtual address 112, the page granularity logic 134 reads fields within the entry 132 that prescribe the granularity of a corresponding physical memory page 154. To determine whether to interpret this granularity according to the legacy or the extended memory protocol, the page granularity logic 134 accesses the PAGEGRAIN register 125 via bus 128. Contents of the PAGEGRAIN register 125 indicate how page size is to be determined in the presence of the granularity information provided by the entry 132.

In a default state, the contents of the PAGEGRAIN register 125 indicate that page size is to be determined according to the legacy memory management protocol 140. But if contents of the PAGEGRAIN register 125 have been modified by an instruction in the extended operating system, then the page granularity logic 134 determines page size according to the extended memory management protocol.

The determined page size (legacy or extended) is provided to the entry access logic 135 and physical address construction logic 136 via signal PAGE SIZE. The entry access logic 135 employs the page size to determine which specific fields within the TLB entry 132 indicated by signal IDX to access. The entry access logic 135 retrieves the specific fields from the entry 132 and provides a physical page number, PFN, corresponding to the virtual address 112 to the physical address construction logic 136. The physical address construction logic 136 constructs a physical address that consists of an upper part and a lower part. The upper part is constructed using upper bits of the physical frame number and the lower part is constructed using lower bits of the virtual address 112. The page size, PAGE SIZE, determines the number and positioning of the upper bits in the upper part of the physical address in addition to the number of the lower virtual address bits that are used to construct the lower part of the physical address.

Figure 2:
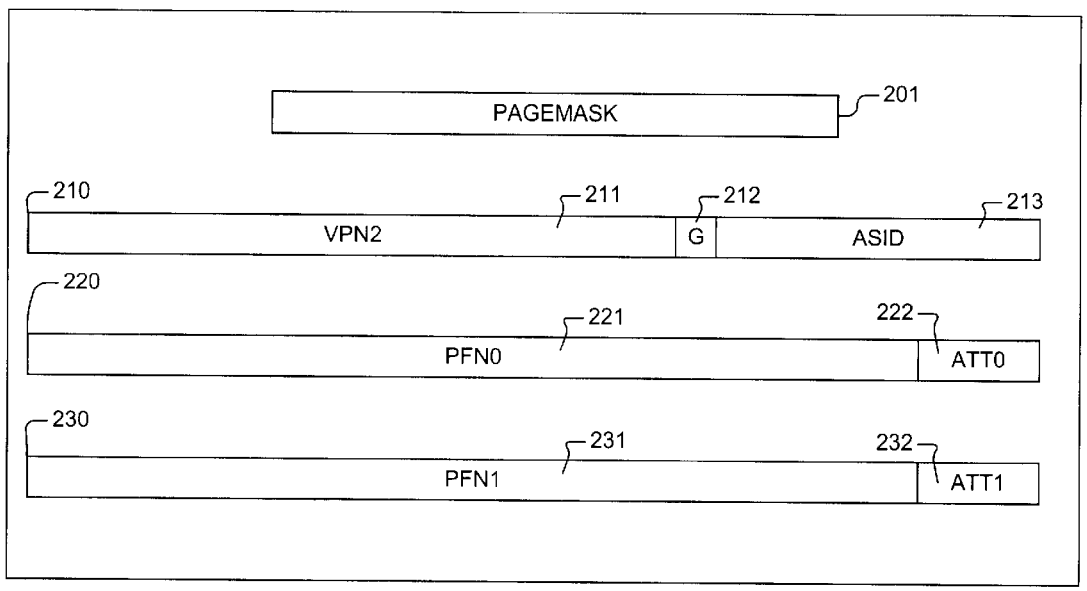
FIG. 2 is a block diagram illustrating a TLB entry within a translation lookaside buffer according to the present invention.

Now referring to FIG. 2, a block diagram is presented illustrating a TLB entry 200 within a translation lookaside buffer according to the present invention. The TLB entry 200 includes a PAGEMASK field 201, a n ENTRYHI field 210, an ENTRYO0 field 220, and an ENTRYLO1 field 230. The fields 201, 210, 220, 230 are named like their counterpart registers 124, 121–123 described with reference to FIG. 1 because contents of their counterpart registers 124, 121–123 are stored within the TLB entry fields 201, 210, 220, 230 .The ENTRYHI field 210 has a VPN2 sub-field 211, a G sub-field 212 , and an ASID sub-field 213. The ENTRYO0 field 220 has a PFN0 sub-field 221 and an ATT0 field 222. The ENTRYLO1 field 230 has a PFN1 sub-field 231 and an ATT1 field 232. In the embodiment shown in FIG. 2, each TLB entry 200 stores address translation and attribute information for two memory pages. Information for a first memory page is stored in the ENTRYO0 field 220 and information for a second memory page is stored in the ENTRYLO1 fields 230.

In operation, the ENTRYHI field 210 is employed to store virtual page numbers, minus their least significant b it in the VPN2 sub-field 211, Physical frame numbers and page attributes (e.g., read/write, read-only, cacheable) that correspond to contents of the VPN sub-field 211 are stored in the PFN0/PFN1 sub-fields 221, 231 and ATT0/ATT1 sub-field s 222, 232. A mask is stored in the PAGEMASK field 201 that is used to mask off lower bits of the VPN2 sub-field 211 when the entry 200 is searched, thus providing for larger page sizes. If bits of the PAGEMASK sub-field 201 are not set, then the least significant bit of a virtual page number is used to select between the ENTRYLO0 sub-field 220 and the ENTRYLO1 sub-field 230. If bits of the PAGEMASK sub-field 201 are set, then a higher-order bit of the virtual page number is employed to select between the ENTRYLO0 sub-field 220 and the ENTRYLO1 sub-field 230. The bit of the virtual page number that is used to select between the ENTRYLO0 sub-field 220 and the ENTRYLO1 sub-field 230 is called the EvenOdd bit (not shown).

The ASID sub-field 213 is employed to store an address space ID (i.e., a process ID) that corresponds to contents of the VPN2 sub-field 211. The state of the G bit 212 determines whether or not an application's address space ID is employed as a match criteria when searching the TLB. If the ASID sub-field 213 is not employed as a match criteria, then searching of the TLB is accomplished only on the basis of virtual page numbers. The use of the ASID sub-field 213 and the G bit 212 enable operating system's to restrict page accesses according to process ID.

As alluded to above, the contents of the PAGEMASK sub-field 201 function as a mask for bits within the VPN2 sub-field 211, thus providing for larger memory page sizes. And in an environment, such as a legacy operating system, where a minimum memory page size is fixed, the contents of PAGEMASK 201 would specify a specific page size as well as page granularity. But within a TLB entry 200 according to the present invention, PAGEMASK 201 only specifies relative page granularity; contents of the PAGEGRAIN register 125 must be applied in order to determine the size of memory pages for the entry 200. Likewise, in the absence of PAGEGRAIN 125 information, the contents of PFN0/PFN1 221/231 are simply higher-order address bits of a physical address; the state of PAGEGRAIN 125 determines which specific upper positions of the physical address that are occupied by contents of the PFN0/PFN1 sub-fields 221/231. To summarize, the state of the PAGEGRAIN register 125 determines which bits of PAGEMASK 201 are really valid. The state of PAGEGRAIN 125 also determines the number of programmable bits of the virtual address 112 that are in the ENTRYHI sub-field 210. In addition, the state of PAGEGRAIN 125 determines the mapping of PFN0/PFN1 sub-fields 221/231 to physical address bits. That is, modifying PAGEGRAIN 125 does not change the number of PFN0/PFN1 sub-field bits 221/231, but it does change the positions within the physical address to which the PFN0/PFN1 sub-field bits 221/231 are mapped.

Prior to discussing embodiments of the present invention that provide specific page size extensions, attention is now directed to FIG. 3 where a method for providing programmable page granularity will now be discussed.

Figure 3:
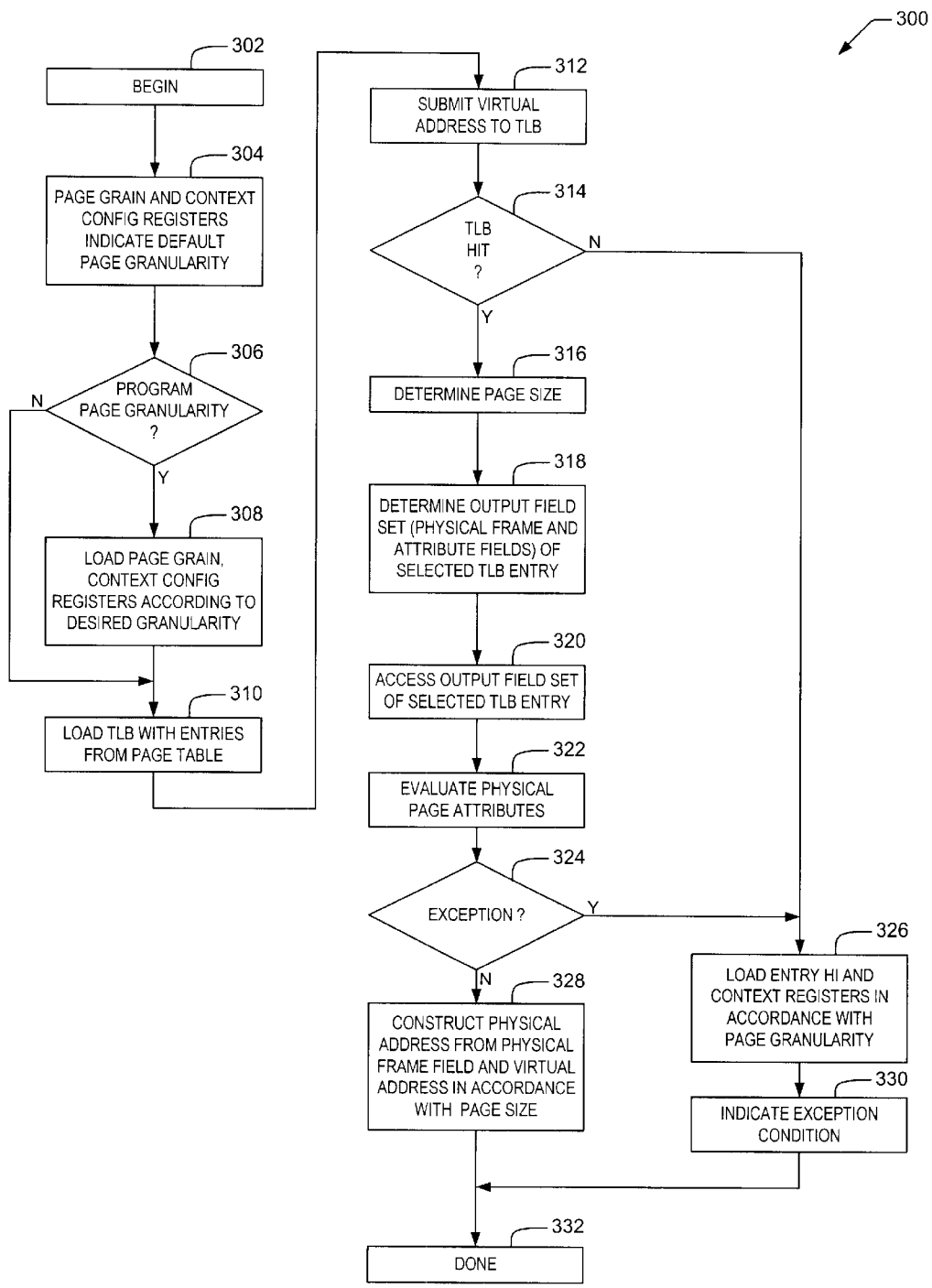
FIG. 3 is a flow chart depicting a method according to the present invention for providing programmable memory page granularity in a virtual memory system that is compatible with a legacy memory management protocol.

FIG. 3 is a flow chart depicting a method according to the present invention for providing programmable memory page granularity and programmable page table access in a virtual memory system that is backwards-compatible with a legacy memory management protocol. The virtual memory system comprises elements like those described with reference to FIGS. 1 and 2.

Flow begins at block 302 where the virtual memory system is initialized. Flow then proceeds to block 304.

At block 304, a PAGEGRAIN register within the system is initialized to indicate a minimum memory page size that is compatible with the legacy memory management protocol. In addition a CONTEXTCONFIG register is initialized to set fields of a CONTEXT register for page table accesses that comport with the legacy memory management protocol. Flow then proceeds to decision block 306.

At decision block 306, an evaluation is made to determine whether or not to program page granularity/page table access for the system. In a legacy configuration, page granularity/page table access set by block 304 is left intact, and flow proceeds to block 310. In an extended configuration, programmable page granularity/page table access is enabled, and flow proceeds to block 308.

At block 308, instructions within an extended operating system are executed to program the PAGEGRAIN and CONTEXTCONFIG registers. The state of the PAGEGRAIN register determines how PAGEMASK bits are interpreted within TLB entries and also how physical frame numbers and virtual offsets are employed together to construct physical addresses during address translation. Similarly, the state of the CONTEXTCONFIG register determines how virtual page number bits are placed within a CONTEXT register according to the present invention when memory management exceptions occur. Flow then proceeds to block 310.

At block 310, operating system software retrieves entries from a page table and provides them to the memory management unit (MMU). Flow then proceeds to block 312.

At block 312, a virtual address is generated by an application program. The virtual address is submitted to the MMU for address translation. Flow then proceeds to decision block 314.

At decision block 314, entries present within the MMU are searched to determine if an entry is present (i.e., a hit) that corresponds to upper address bits of the virtual address. If there is a hit, then flow proceeds to block 316. If there is a miss, then flow proceeds to block 326.

At block 316, a PAGEMASK field within the identified entry is employed along with contents of the PAGEGRAIN register to determine the size of the memory page associated with the identified entry. Contents of the PAGEGRAIN register effectively establish a minimum page size for the system and bits within the PAGEMASK field specify the page granularity to increase the size of the pages. Flow then proceeds to block 318.

At block 318, the page size determined in block 316 is employed to determine one of two output field sets within the entry. Determination of the page size establishes which bit of the virtual address (i.e., the EvenOdd bit) is used to select between the two output field sets. Each output field set contains a physical frame number field and attribute field that correspond to each of two memory pages. Flow then proceeds to block 320.

At block 320, the EvenOdd bit is employed to access the selected output field set of the selected page table entry within the MMU. Flow then proceeds to block 322.

At block 322, the attribute field of the selected output field set is evaluated in view of the conditions that caused generation of the virtual address. Flow then proceeds to decision block 324.

At block 324, an evaluation is made to determine whether or not the conditions that caused generation of the virtual address are normal, or whether they are exceptional. If an exception condition is identified, then flow proceeds to block 326. If there is no exception, then flow proceeds to block 328.

At block 326, ENTRYHI and CONTEXT registers according to the present invention are loaded with virtual address information and page table entry address information that will enable an exception handler to resolve the miss or the exception condition. The page granularity/page table configuration prescribed by the PAGEGRAIN and CONTEXTCONFIG registers is employed to determine how to load the ENTRYHI and CONTEXT registers so that address information comports with the programmed (or default) page granularity/page table structure. Flow then proceeds to block 330.

At block 330, the operating system is alerted with an indication of the condition that caused the exception/miss to occur. Flow then proceeds to block 332.

At block 328, a physical address is constructed that corresponds to the generated virtual address. The physical address consists of an upper part and a lower part. The upper part is constructed from the physical frame number and the lower part is constructed from low-order bits of the virtual address. The page size determined in block 316 and the state of the PAGEGRAIN register designate how many bits of the physical frame number are used to construct the upper part and which positions of the physical address that the upper part occupies. The page size alone indicates how many of the lower bits are used to construct the lower part. For example, in an embodiment comprising 36-bit physical addresses, where the PAGEGRAIN register is in its default state and PAGEMASK in concert with PAGEGRAIN indicate 4K memory pages, bits 11:0 of the virtual address are used to form bits 11:0 of the physical address (i.e., the lower part). A 24-bit physical frame number occupies bits 35:12 of the physical address (i.e., the upper part). If PAGEGRAIN is then programmed to indicate 2K pages, then the demarcation between lower and upper parts of the physical address changes. Bits 10:0 of the virtual address are used to form bits 10:0 of the physical address, the physical frame number bits are shifted right in the physical address to occupy bits 34:11, and bit 35 of the physical address is set to 0. Programming PAGEGRAIN to indicate 1K pages causes bits 35:34 of the physical address to be set to 0, the physical frame number is shifted right to occupy bits 33:10, and bits 9:0 of the virtual address make up the lower part. If the state of PAGEGRAIN is held constant, then programming PAGEMASK to indicate different page sizes does not cause the physical frame number to shift positions inside the physical address; this only causes more bits of the virtual address to be used to construct the lower part and less bits of the physical frame number to be used to construct the upper part. Following construction of the physical address, flow then proceeds to block 332.

At block 332, the method completes.

For clarity, the discussion with reference to FIGS. 1 through 3 has been presented without assigning sizes to pages, entries, addresses, fields, or registers according to the present invention. This is because the contemplated invention can be used to program memory page granularities in a wide variety of virtual memory systems. Within these systems, an additional register (i.e., PAGEGRAIN) is provided to qualify the meaning of existing page table entries with respect to page granularity, page size, and the generation of physical addresses. Having now described the programmable page granularity mechanism and method, FIGS. 4–12 will now be discussed in the context of a programmable page granularity mechanism in a virtual memory system having page sizes bounded at the lower end to a 4 KB minimum page size by legacy protocol. An extended protocol allows designers to program the PAGEGRAIN register such that the minimum page size is decreased to either 2 KB or 1 KB minimum.

Referring to FIG. 4, a block diagram is presented showing a PAGEMASK register 400 according to the present invention. The PAGEMASK register 400 is a 32-bit register 400 that has a MASK field 401 occupying bits 24-11, thus providing designers with the ability to program 14 mask bits to increase the size of memory pages. The MASK field 401 is positioned in bits 24-11 of the register 400 to allow masking in a double-entry TLB embodiment (i.e., an embodiment where each TLB entry stores two physical frame numbers) that provides for page sizes ranging from 2 KB to 16 MB. Contents of the PAGEMASK register 400 are loaded into the PAGEMASK field of each TLB entry to prescribe the size of the two memory pages that correspond to the entry.

Now referring to FIG. 5, a block diagram is presented featuring a PAGEGRAIN register 500 according to the present invention. The PAGEGRAIN register 500 has a MASK field 501 occupying bits 12-11. As alluded to above, contents of the PAGEGRAIN register 500 are employed to qualify the page granularity prescribed by the PAGEMASK register 400. That is, the MASK field 501 in bits 12-11 of PAGEGRAIN 500 determine whether bits 12-11 of the MASK field 401 of PAGEMASK are valid. In an embodiment that is compatible with legacy memory management protocol having a minimum page size of 4 KB, the MASK field 501 defaults to a legacy state having bits 12-11 set. When bits 12-11 of PAGEGRAIN are set, then bits 12-11 of the PAGEMASK register 400 and ENTRYHI register are read as 0 and they are not used in address translation. The physical frame number provided by the TLB is used to occupy bits 12 and higher of a physical address and bits 11-0 of a virtual address are used as an offset into a 4 KB memory page. Increasing the page size by setting bits of the PAGEMASK register 400 increases the number of virtual address bits that are used for the offset and decreases the number of physical frame number bits that are used to make the upper part of the physical address.

When bit 11 of the PAGEGRAIN register 500 is set and bit 12 is not set, then bit 12 of PAGEMASK 400 and ENTRYHI are enabled and are used in address translation. Bit 11 of PAGEMASK and ENTRYHI are read as 0 and are not used in address translation. The physical frame bits are shifted right by one bit in the physical address and the most significant physical address bit is set to 0. Programming PAGEGRAIN 500 in this manner is a means to lower the minimum page size to 2 KB.

When the MASK field 501 of PAGEGRAIN 500 is programmed to 0 in bits 12 and 11, then bits 12-11 of PAGEMASK 400 and ENTRYHI are enabled and are used in address translation. Programming PAGEGRAIN in this manner lowers the minimum page size to 1 KB. The physical frame bits are shifted right by one more bit in the physical address and the two most significant physical address bits are set to 0.

Now referring to FIG. 6, a table 600 is provided illustrating how bits within the PAGEMASK register 400 of FIG. 4 are employed to designate page size in a virtual memory system according to the present invention. Setting all the bits in the MASK field 401 to 0 designates a 1 KB page size. Setting bit 11 of the MASK field 401 designates a 2 KB page size. Setting bits 12-11 designates a 4 KB page size, and setting bits 24-11 designates a 16 MB page size. It is noted that bits 12-11 of PAGEMASK 400 can be disabled and overridden by programming the MASK field 501 of PAGEGRAIN 500. In one embodiment, the contents of PAGEMASK 400 and PAGEGRAIN 500 are logically ORed together to create an effective pagemask. In this embodiment, if PAGEGRAIN is initialized to comport with a 4 KB page size legacy protocol (i.e., bits 12-11 of MASK 501 set to 1), then the effective pagemask has bits 12-11 set, thus causing 1) bits 12-11 of a virtual page number to be ignored during translation and 2) bits 12-11 of a virtual address to be used as an offset. Note that larger page sizes according to the present invention can be enabled by programming PAGEMASK 400 in and of itself. Programming PAGEGRAIN 500 1) enables bits 12 and/or 11 of the PAGEMASK register 400 to be used for address translation and 2) shifts the physical frame number bits right in the construction of a physical address. Since the MASK field 501 of PAGEGRAIN 500 defaults to 1's, page sizes less than 4 KB are initially disabled. Only instructions in an extended operating system can be employed to set the bits of PAGEGRAIN to enable 1 KB or 2 KB pages. Thus, the contents of PAGEMASK 400 specify a page granularity for physical memory pages; PAGEGRAIN 500 modifies the lower bound of the prescribed page granularity and shifts the use of physical frame number bits in the construction of a physical address to enable lower minimum page sizes to be programmed while at the same time maintaining compatibility the legacy memory management protocol.

Figure 7:
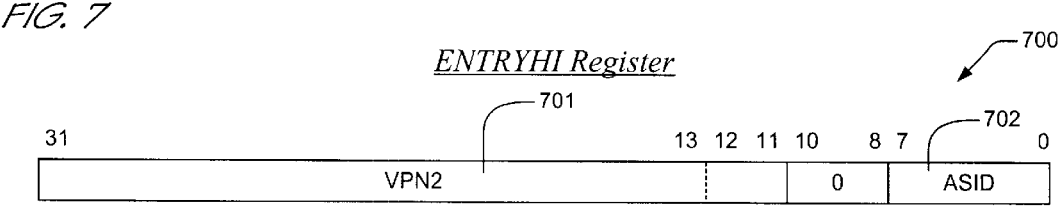
FIG. 7 is a block diagram showing an ENTRYHI register according to the present invention.

Now referring to FIG. 7, a block diagram is presented showing an ENTRYHI register 700 according to the present invention. The ENTRYHI register 700 has a VPN2 field 701 and an ASID field 702. The VPN2 field 701 spans bits 31-11 of the register 700, thus providing for storage of virtual page numbers in a 32-bit virtual address space at a 1 KB page granularity. Since contents of the ENTRYHI register 700 correspond to two memory pages in a double-entry TLB embodiment, storage of bit 10 of the VPN is not required. The ASID field 702 allows for storage of up to 256 different address space IDs. As noted above, bits of the MASK field 501 of PAGEGRAIN 500 that are set to 0 cause corresponding bits of the ENTRYHI register 700 to read 0 and to be ignored during address translation.

Figure 8:
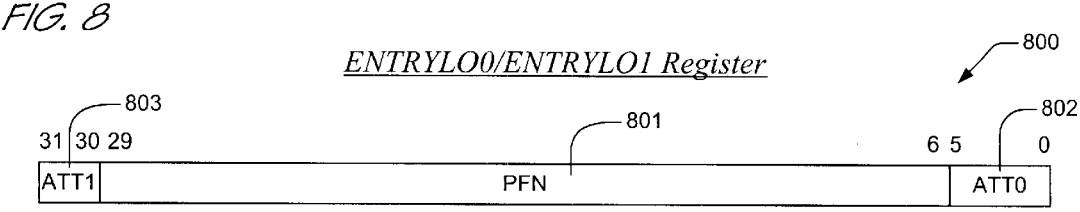
FIG. 8 is a block diagram depicting an ENTRYLO register according to the present invention.

Referring to FIG. 8, a block diagram is presented depicting an ENTRYLO register 800 according to the present invention. The ENTRYLO register 800 is used to store physical frame numbers and attributes corresponding to memory pages. The format of the ENTRYLO0 and ENTRYLO1 registers 800 is the same. Each register 800 has a PFN field 801 and two attribute fields 802, 803. The attribute fields 802, 802 store attribute and access privilege data for the corresponding memory page. The PFN field 801 spans bits 29-6 and is used to store up to a 24-bit physical frame number for the corresponding memory page. When PAGEGRAIN 500 is programmed its default, the bits of the PFN field 801 are used to construct the most significant bits of a physical address and MASK bits 401 of PAGEMASK 400 determine how many low-order bits of the virtual address are used to construct the lower part of a physical address. When more virtual address bits are used to construct the lower part of the physical address, then less low-order bits of the PFN 801 are used to construct the upper part of the physical address. Programming PAGEGRAIN 500 to allow for lower page sizes results in shifting the PFN 801 to the right an appropriate number of bits in the physical address and setting the remaining most significant physical address bits to 0.

Figure 9:
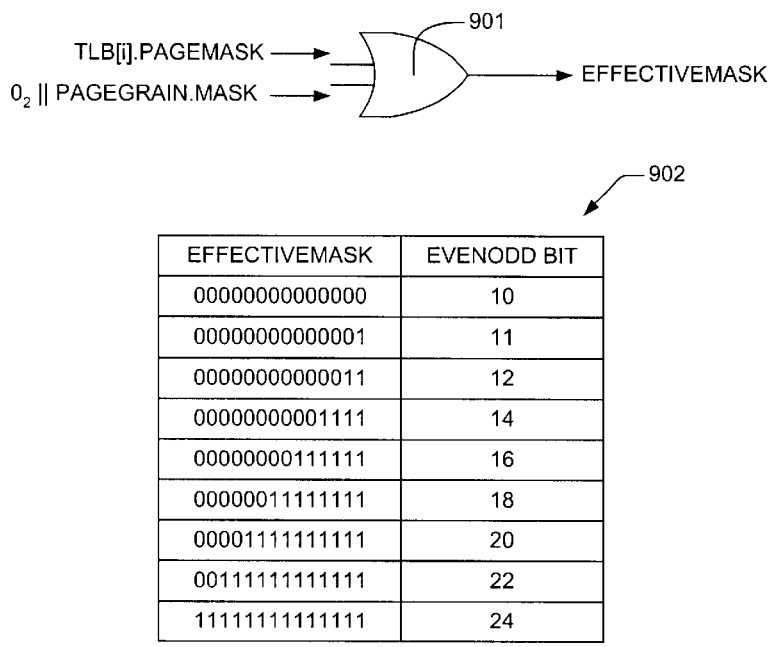
FIG. 9 is a diagram illustrating determination of an EVENODD bit for accessing fields within a TLB entry.

Now referring to FIG. 9, a diagram is presented illustrating determination of an EVENODD bit for accessing fields within a TLB entry. As noted above, an effective pagemask, EFFECTIVEMASK, is created according to the present invention by logically ORing the PAGEMASK field from a selected TLB entry, TLB[i], with the MASK field 501 of the PAGEGRAIN register 500. For illustration purposes, an OR gate 901 is shown in block diagram. One skilled in the art will appreciate, however, that the logical OR function can be accomplished in software as well as hardware. Table 902 illustrates how EFFECTIVEMASK is employed to identify which bit of the virtual address (i.e., the EvenOdd bit) is used to select either the ENTRYO0 field or the ENTRYLO1 field within the TLB entry. An EFFECTIVEMASK equal to all zeros designates a 1 KB page size, and hence bit 10 of the virtual address is used to select between the two ENTRYLO fields in the TLB entry. When EFFECTIVEMASK is equal to all 1's, then 16 MB pages are designated, and bit 24 of the virtual address is employed to select either ENTRYO0 field or ENTRYLO1 field in the TLB entry.

Now referring to FIG. 10, a table 1000 is presented showing how physical addresses are generated for different bit combinations of the PAGEMASK 400 and PAGEGRAIN registers 500. It is significant to note that different combinations of PAGEGRAIN and PAGEMASK can be employed to designate the same page size. But although different combinations result in the same page size, the construction of physical addresses differs according to how bits of PAGEGRAIN are set, as has been discussed above. In one embodiment, it is anticipated that the memory management unit initializes PAGEGRAIN 500 to a value commensurate with the smallest page size required by all of the applications. Subsequently, only PAGEMASK values are manipulated to adjust the granularity of each page according to the requirements of each application.

One (1) KB pages can be established by programming the PAGEGRAIN MASK bits and PAGEMASK MASK bits to 0. This results in an EFFECTIVEMASK of 0 that designates 1 KB pages. Hence, virtual address bit 10 is employed by entry access logic to select between the two ENTRYLO fields of the TLB entry to retrieve the appropriate physical frame number (PFN). Bits 33-10 of a 36-bit physical address are constructed by concatenating the upper 22 bits of the 24-bit PFN field with the lower 10 bits of the virtual address. Bits 35-34 of the 36-bit physical address are set to 0.

2 KB pages can be established by programming the PAGEGRAIN MASK bits to 00 and programming bit 11 of the PAGEMASK to 1 or by programming PAGEGRAIN MASK bits to 01 and the PAGEMASK MASK bits to all 0's (bit 11 of PAGEMASK can be set to 1 as well). HENCE, virtual address bit 11 is employed as the EvenOdd bit. When PAGEGRAIN MASK is set to 00, then the upper 23 bits of the PFN occupy bits 33-11 of the physical address. Bits 35-34 of the physical address are set to 0 and bits 10-0 are occupied by virtual address bits 10-0.

Different combinations of PAGEGRAIN and PAGEMASK result in increased memory page sizes whose physical addresses are generated by concatenating selected bits of the PFN with lower bits of the virtual address. For fixed PAGEMASK values, changing PAGEGRAIN causes more/less PFN bits to be used to construct the upper part of a physical address, with remaining most significant physical address bits being forced to 0 when required. At the high end, 16 MB page sizes are designated in a 36-bit physical address system by setting PAGEMASK MASK and PAGEGRAIN MASK to 1's. The physical address for a 16 MB page is constructed by concatenating the upper 12 bits of the PFN field with the lower 24 bits of the virtual address.

Figure 11:
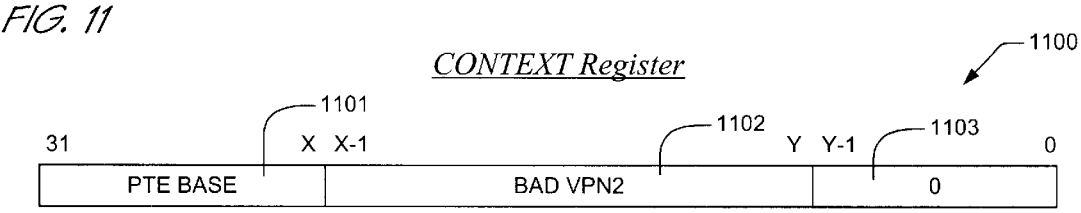
FIG. 11 is a block diagram illustrating a CONTEXT register according to the present invention.

Now referring to FIG. 11, a block diagram is presented illustrating a CONTEXT register 1100 according to the present invention. As noted in the discussion with reference to FIGS. 1 and 3, the CONTEXT register 1100 can be employed by the legacy/extended operating system as a pointer to a page table entry that corresponds to an virtual address that has suffered an exception within the memory management unit. The CONTEXT register 1100 has a PTE Base field 1101, a Bad VPN2 field 1102, and a 0 field 1103.

Operationally, the CONTEXT register 1100 is a read/write register containing a pointer to an arbitrary power-of-two-aligned data structure in memory, such as an entry in a page table entry (PTE) array. In contrast to present day registers of this sort that reference fixed-length (e.g., 16-byte) entries within structures of a static configuration, the CONTEXT register 1100 according to the present invention affords an additional level of flexibility to the system designer. Because the size in bits of fields 1101-1103 within the CONTEXT register 1100 is programmable via the CONTEXTCONFIG register (not shown), the CONTEXT register 1100 may be programmed to point to, say, an 8-byte pair of 32-bit PTEs within a single-level page table, or it may be programmed to point to a first-level page directory entry in a two-level page access scheme.

In a 32-bit virtual address embodiment, an exception within the memory management unit (MMU) causes virtual address bits $31:31-((X-Y)-1)$ to be written to the Bad VPN2 field 1102 (i.e., bits X-1:Y of the register 1100), where this range corresponds to a contiguous range of asserted bits in the CONTEXTCONFIG register. Field PTE Base 1101 can be read/written by the operating system and are not affected by exception conditions. The 0 field 1103 always read as 0. For example, if the CONTEXTCONFIG register is programmed to set bit X of CONTEXT 1100 to 23 and bit Y to 4, then the behavior of exception conditions via CONTEXT 1100 is backwards compatible with the page table access protocol prescribed by the MIPS32™ architecture.

Figure 12:
FIG. 12 is a block diagram featuring a CONTEXTCONFIG register according to the present invention.

Now referring to FIG. 12, a block diagram is presented featuring a CONTEXTCONFIG register 1200 according to the present invention. The CONTEXTCONFIG register 1200 includes a VIRTUAL INDEX field 1201 providing system designers with the capability to program a mask of 0 to 32 contiguous asserted bits that cause corresponding bits 1102 of the CONTEXT register 1100 to be written with the high-order bits of a virtual address that has caused an exception.

The CONTEXTCONFIG register 1200 defines bits 1102 of the CONTEXT register 1100 into which the high-order bits of the virtual address causing the exception will be written, and how many bits of that virtual address will be extracted. Bits above the Bad VPN2 field 1102 are read/write to software and serve as the PTE Base field 1101. Bits below the Bad VPN2 field 1102 will read 0.

For instance, if a system designer asserts all the bits in the VIRTUAL INDEX field 1201, then all 32 bits of an excepting virtual address will be copied into the CONTEXT register. At the other extreme, deasserting all bits in the VIRTUAL INDEX field 1201 causes all bits of CONTEXT 1100 to be considered as the PTE Base field 1101, thus providing full read/write capabilities that are unaffected by exceptions.

Although the present invention and its objects, features, and advantages have been described in detail, other embodiments are encompassed by the invention as well. In addition to implementations of the invention using hardware, the invention can be embodied in software disposed, for example, in a computer usable (e.g., readable) medium configured to store the software (i.e., a computer readable program code). The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, and so on, or other programming and/or circuit (i.e., schematic) capture tools available in the art. The program code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a core (e.g., a microprocessor core) that is embodied in program code and may be transformed to hardware as part of the production of integrated circuits. Also, the invention may be embodied as a combination of hardware and software.

In addition, the present invention has been particularly characterized in terms of a general purpose CPU or microprocessor. This characterization is presented herein as a representative embodiment for the present invention, however, such description should by no means restrict application of the concept of extending virtual memory access protection schemes. On the contrary, the present invention can be embodied within a graphics processor, a digital signal processor, as well as less commonly known components to include communications processors, video processors, second-tier memory management units, and micro controllers.

Furthermore, the present invention has been specifically presented in terms of a CPU that is capable of implementing certain well-known virtual page management features provided for by the MIPS32™ and MIPS64™ architectures available from MIPS Technologies, Inc. These exemplary management features are employed herein because they provide a recognizable basis for teaching the present invention, however, it should not be construed that application of the present invention is limited to these types or ranges of addressing features. Rather, the present invention contemplates any form of page-based management extensions provided for by a MIPS architecture TLB, or the TLB of any other architecture or manufacturer.

Additionally, the present invention has been described herein in accordance with translation lookaside buffer (TLB) embodiments that consist of entries mapping one virtual page number to two physical page numbers, where such mapping is controlled by a selected bit of a virtual page number. Although these types of TLBs are commonly encountered within the art, it is also noted that the present invention comprehends other TLB architectures as well. For instance, the present invention can be applied to TLB structures that map a single virtual page number to a single physical frame number as well.

Furthermore, although a TLB-based structure has been employed to teach the present invention, one skilled in the art will appreciate that the concepts, methods, and techniques according to the present invention can be embodied within any page-based memory management unit, to include those without TLBs or those without visible TLBs. The principle of generating page tables for appropriate page granularity and then setting the granularity of the memory management unit before the first entry is fetched is transparent to details of particular embodiments. For example, the present invention comprehends memory management unit embodiments where the functionality of "visible" TLB entry registers such as have been previously described (i.e., ENTRYLO, ENTRYHI, CONTEXT) is entirely subsumed within logic of the embodiments.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus for providing programmable minimum memory page sizes, the apparatus comprising:

a pagegrain register, configured to prescribe a minimum page size, in default, according to a legacy memory management protocol, and in alternative, as one of the programmable minimum memory page sizes according to an extended memory management protocol; and a memory management unit (MMU), coupled to said pagegrain register, configured to store a plurality of page table entries (PTEs), each of said plurality of PTEs specifying a page granularity for a corresponding physical memory page, wherein said page granularity is bounded by said minimum page size, said MMU comprising:

page granularity logic, configured to determine a page size for said corresponding physical memory page, wherein said page size is determined based on said minimum page size and said page granularity.

2. The apparatus as recited in claim 1, wherein said minimum page size according to said legacy memory management protocol is 4 KB.

3. The apparatus as recited in claim 2, wherein the programmable minimum memory page sizes according to said extended memory management protocol comprise a 1 KB minimum page size, a 2 KB minimum page size, and a 4 KB minimum page size.

4. The apparatus as recited in claim 1, wherein said pagegrain register is programmed to prescribe said one of the programmable minimum memory page sizes by execution of an instruction in accordance with said extended memory management protocol.

5. The apparatus as recited in claim 4, wherein said each of said plurality of PTEs comprises a physical frame number (PFN) field, and wherein bits of said PFN field are employed to construct an upper part of a physical address associated with said corresponding physical memory page.

6. The apparatus as recited in claim 5, wherein said MMU further comprises:

physical address construction logic, coupled to said page granularity logic, configured to construct said upper part, and a lower part of said physical address using lower bits of a virtual address, wherein said page size determines how many of said lower bits are used to construct said lower part, and the positions within said upper part that are occupied by bits taken from said physical frame number field.

7. The apparatus as recited in claim 6, wherein said MMU further comprises:

a translation lookaside buffer (TLB), coupled to said physical address construction logic, configured to store frequently used ones of said plurality of PTEs, and configured to provide said PFN field for construction of said upper part of said physical address.

8. The apparatus as recited in claim 7, wherein said TLB comprises a software-based TLB.

9. The apparatus as recited in claim 7, wherein said TLB comprises a hardware-based TLB.

10. A computer program product for use with a computing device, the computer program product comprising:

a computer usable medium, having computer readable program code embodied in said medium, for causing a CPU to be described, said CPU being capable of sizing memory pages according to a legacy memory management technique or an extended memory management technique, said computer readable program code comprising:

first program code, for describing a memory management unit (MMU), said MMU configured to store page table entries (PTEs), each of said PTEs prescribing a page granularity for a corresponding physical memory page, wherein said page granularity is bounded by a minimum page size;

second program code, for describing page granularity logic within said MMU, and being configured to establish a page size for said corresponding physical memory page, wherein said page size is established as a function of a minimum page size and said page granularity; and third program code, for describing a pagegrain register, said pagegrain register being coupled to said MMU, said pagegrain register configured to specify said minimum page size, in default, according to said legacy memory management technique, and in alternative, according to said extended memory management technique.

11. The computer program product as recited in claim 10, wherein said minimum page size according to said legacy memory management technique is 4 KB.

12. The computer program product as recited in claim 10, wherein said minimum page size according to said extended memory management technique can be programmed to either 1 KB, 2 KB, or 4 KB.

13. The computer program product as recited in claim 12, wherein said pagegrain register is programmed to prescribe said minimum page size via execution of an instruction according to said extended memory management technique.

14. The computer program product as recited in claim 13, wherein said each of said PTEs comprises a physical frame number (PFN) field, and wherein bits of said PFN field are employed to construct an upper part of a physical address associated with said corresponding physical memory page.

15. The computer program product as recited in claim 14, further comprising:

fourth program code, for describing physical address construction logic within said MMU, said physical address construction logic being coupled to said page granularity logic, and being configured to construct said upper part, and a lower part of said physical address using lower bits of a virtual address, wherein said page size determines how many of said lower bits are used to construct said lower part, and the positions within said upper part that are occupied by bits taken from said physical frame number field.

16. The computer program product as recited in claim 15, further comprising:

fifth program code, for describing a translation lookaside buffer (TLB) within said MMU, coupled to said physical address construction logic, configured to store frequently used ones of said PTEs, and configured to provide said PFN field for construction of said upper part of said physical address.

17. The computer program product as recited in claim 16, wherein said TLB comprises a software-based TLB.

18. The computer program product as recited in claim 16, wherein said TLB comprises a hardware-based TLB.

19. A computer data signal embodied in a transmission medium, comprising:

first computer-readable program code, for describing a memory management unit (MMU), said MMU configured to store page table entries (PTEs), each of said PTEs specifying a page granularity for a corresponding physical memory page, wherein said page granularity is bounded by a minimum page size;

second computer-readable program code, for describing page granularity logic within said MMU, said page granularity logic configured to determine a page size for said corresponding physical memory page, wherein said page size is determined based on said minimum page size and said page granularity; and third computer-readable program code, for describing a pagegrain register coupled to said MMU, said pagegrain register configured to prescribe said minimum page size, in default, according to a legacy memory management protocol, and in alternative, according to an extended memory management protocol.

20. The computer data signal as recited in claim 19, wherein said minimum page size according to said legacy memory management protocol is 4 KB.

21. The computer data signal as recited in claim 19, wherein said minimum page size according to said extended memory management protocol can be programmed to either 1 KB, 2 KB, or 4 KB.

22. The computer data signal as recited in claim 21, wherein said pagegrain register is programmed to prescribe said minimum page size via execution of an instruction according to said extended memory management protocol.

23. The computer data signal as recited in claim 22, wherein said each of said PTEs comprises a physical frame number (PFN) field, and wherein bits of said PFN field are employed to construct an upper part of a physical address associated with said corresponding physical memory page.

24. The computer data signal as recited in claim 23, further comprising:

fourth computer-readable program code, for describing physical address construction logic within said MMU, said physical address construction logic being coupled to said page granularity logic, and being configured to construct said upper part, and a lower part of said physical address using lower bits of a virtual address, wherein said page size determines how many of said lower bits are used to construct said lower part, and the positions within said upper part that are occupied by bits taken from said physical frame number field.

25. The computer data signal as recited in claim 24, further comprising:

fifth computer-readable program code, for describing a translation lookaside buffer (TLB) within said MMU, coupled to said physical address construction logic, configured to store frequently used ones of said PTEs, and configured to provide said PFN field for construction of said upper part of said physical address.

26. The computer data signal as recited in claim 25, wherein said TLB comprises a software-based TLB.

27. The computer data signal as recited in claim 25, wherein said TLB comprises a hardware-based TLB.

28. A method for providing programmable minimum memory page sizes, the method comprising:

within a memory management unit (MMU), storing page table entries (PTEs), wherein each of the PTEs prescribes a page granularity for a corresponding physical memory page, and wherein the page granularity is bounded by a minimum page size;

initiating contents of a pagegrain register to designate the minimum page size such that address translation comports with a legacy memory management protocol;

programming the contents of the pagegrain register to designate the minimum page size such that address translation comports with an extended memory management protocol; and determining a page size for the corresponding physical memory page based on the page granularity and said programming.

29. The method as recited in claim 28, wherein said initiating sets the minimum page size to 4 KB.

30. The method as recited in claim 28, wherein said programming sets the minimum page size to either 1 KB, 2 KB, or 4 KB.

31. The method as recited in claim 28, wherein said programming comprises:

executing an instruction in accordance with said extended memory management protocol.

32. The method as recited in claim 28, wherein said storing comprises:

within the each of the PTEs, employing a physical frame number (PFN) field, wherein bits of the PFN field are used to generate an upper part of a physical address associated with the corresponding physical memory page.

33. The method as recited in claim 32, further comprising:

first constructing the upper part, wherein the page size determines positions within the upper part that are occupied by bits taken from the physical frame number field; and second constructing a lower part of the physical address using lower bits of a virtual address, wherein the page size determines how many of the lower bits are used to construct the lower part.

34. The method as recited in claim 28, wherein said storing comprises:

employing a translation lookaside buffer (TLB) that is configured to store frequently used PTEs; and from the TLB, providing said PFN field for construction of said upper part of said physical address.

35. The method as recited in claim 34, wherein said TLB is a software-based TLB.

36. The method as recited in claim 34, wherein said TLB is a hardware-based TLB.

37. A virtual memory system, for providing programmable minimum memory page sizes, the virtual memory system comprising:

a central processing unit (CPU), for accessing instructions/data within a physical memory, wherein access of said instructions/data is controlled according to a legacy virtual memory management protocol or an extended virtual memory management protocol, said CPU comprising:

a pagegrain register, configured to prescribe a minimum page size, in default, according to said legacy memory management protocol, and in alternative, as one of the programmable minimum memory page sizes according to said extended memory management protocol; and a memory management unit (MMU), coupled to said pagegrain register, configured to store a plurality of page table entries (PTEs), each of said plurality of PTEs specifying a page granularity for a corresponding physical memory page, wherein said page granularity is bounded by said minimum page size, said MMU comprising:

page granularity logic, configured to determine a page size for said corresponding physical memory page, wherein said page size is determined based on said minimum page size and said page granularity.

* * * * *